United States Patent
Ishihara (10) Patent No.: US 10,296,420 B2
(45) Date of Patent: May 21, 2019

(54) VEHICLE COMMUNICATION APPARATUS, PROGRAM PRODUCT AND COMMUNICATION SYSTEM

(71) Applicant: DENSO CORPORATION, Kariya, Aichi-pref. (JP)

(72) Inventor: Toshiro Ishihara, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/758,006

(22) PCT Filed: Aug. 22, 2016

(86) PCT No.: PCT/JP2016/074317
§ 371 (c)(1),
(2) Date: Mar. 7, 2018

(87) PCT Pub. No.: WO2017/047324
PCT Pub. Date: Mar. 23, 2017

(65) Prior Publication Data
US 2018/0253356 A1    Sep. 6, 2018

(30) Foreign Application Priority Data
Sep. 15, 2015    (JP) ................................ 2015-181807

(51) Int. Cl.
*G06F 11/14* (2006.01)
*B60R 16/02* (2006.01)
(Continued)

(52) U.S. Cl.
CPC .......... *G06F 11/1446* (2013.01); *B60R 16/02* (2013.01); *B60R 25/24* (2013.01);
(Continued)

(58) Field of Classification Search
CPC ........... G06F 11/14; G06F 1/24; B60R 16/02; H04Q 7/32; H04Q 7/38; H04M 3/42
(Continued)

(56) References Cited

U.S. PATENT DOCUMENTS

| | | | |
|---|---|---|---|
| 8,949,823 B2 * | 2/2015 | Ricci | G06F 13/14 |
| | | | 717/168 |
| 2015/0015063 A1 | 1/2015 | Bissontz | |
| 2017/0093643 A1 * | 3/2017 | Ricci | H04W 4/90 |

FOREIGN PATENT DOCUMENTS

| | | |
|---|---|---|
| JP | 4151534 B2 | 9/2008 |
| JP | 2013142910 A | 7/2013 |

* cited by examiner

*Primary Examiner* — Tan Q Nguyen
(74) *Attorney, Agent, or Firm* — Harness, Dickey & Pierce, P.L.C.

(57) ABSTRACT

A vehicle communication apparatus includes a reset object portion, a reset portion, a power source determination portion, and a reset execution portion. The reset object portion executes a software in both an on state and an off state of a vehicle power source. The reset portion resets an operation of the software executed by the reset object portion. The power source determination portion determines whether the vehicle power source is in the on state or the off state. The reset execution portion controls the reset portion to reset the operation of the software executed by the reset object portion at a reset time point that is preliminary determined in the off state of the vehicle power source. The reset portion resets the operation of the software when the power source determination portion determines that the vehicle power source is in the off state.

13 Claims, 11 Drawing Sheets

(51) Int. Cl.
*G06F 1/24* (2006.01)
*B60R 25/24* (2013.01)

(52) U.S. Cl.
CPC ................ *G06F 1/24* (2013.01); *G06F 11/14* (2013.01); *G06F 11/1441* (2013.01)

(58) Field of Classification Search
USPC .......................................................... 701/36
See application file for complete search history.

VEHICLE COMMUNICATION APPARATUS, PROGRAM PRODUCT AND COMMUNICATION SYSTEM

CROSS REFERENCE TO RELATED APPLICATIONS

This application is a U.S. National Phase Application under 35 U.S.C. 371 of International Application No. PCT/JP2016/074317 filed on Aug. 22, 2016 and published in Japanese as WO 2017/047324 A1 on Mar. 23, 2017. This application is based on and claims the benefit of priority from Japanese Patent Application No. 2015-181807 filed on Sep. 15, 2015. The entire disclosures of all of the above applications are incorporated herein by reference.

TECHNICAL FIELD

The present disclosure relates to a vehicle communication apparatus, a program product, and a communication system.

BACKGROUND ART

Conventionally, a vehicle communication apparatus that has a wireless communication function is provided. In one of this type of the vehicle communication apparatus, when a vehicle power source is in on state, a service, such as an emergency call, a destination setting by data communication, or a voice communication is executed, and when the vehicle power source is in off state, a service, such as a vehicle tracking for theft, a remote engine start, or a remote door lock and unlock is executed. This type of the vehicle communication apparatus employs a wireless technique similar to a mobile phone, such as a smartphone, and executes complicated software. Thus, it is concerned that software operation becomes unstable after a long period of use.

Another apparatus that executes complicated software may include a navigation device. The navigation device generally executes the software only in on state of the vehicle power source. In the navigation device, when a user switches IG (ignition) and ACC (accessory) from on state to off state and gets off a vehicle, the vehicle power source switches to off state, and when the user switches IG and ACC from off state to on state and gets on the vehicle, the vehicle power source switches to on state so that the software operation is reset (that is, initialized). With this configuration, the software operation can be stabilized at a time of switching from off state to on state of the vehicle power source. On the other hand, the above described vehicle communication apparatus executes the software both on state and off state of the vehicle power source. Thus, the vehicle communication apparatus is incapable of resetting the software operation at the time that the vehicle power source is switched to on state or off state, which is different from the navigation device, so the software is incapable of being stabilized.

The software operation to be stabilized is disclosed in Patent Literature 1. In Patent Literature 1, monitor software that only monitors the software operation is integrated. With this configuration, when the monitor software detects abnormality of the software operation, the software operation is reset (see, e.g., Patent literature 1).

PRIOR ART LITERATURE

Patent Literature

Patent Literature 1: JP 2013-142910 A

SUMMARY OF INVENTION

In a technique that is disclosed in Patent Literature 1, automatic reset is executed after abnormality of software operation occurs, so the automatic reset is valid. The configuration that the automatic reset is executed after abnormality of the software operation occurs is not suitable for a vehicle communication apparatus that needs operation with high urgency, such as an emergency call.

In view of the foregoing difficulties, it is an object of the present disclosure to provide a vehicle communication apparatus, a program product and a communication system, each of which is capable of properly resetting and stabilizing the software operation when the software is executed both in on state and off state of the vehicle power source.

According to an aspect of the present disclosure, the vehicle communication apparatus includes a reset object portion, a reset portion, a power source determination portion, and a reset execution portion. The reset object portion executes a software in both an on state and an off state of a vehicle power source. The reset portion resets an operation of the software executed by the reset object portion. The power source determination portion determines whether the vehicle power source is in the on state or the off state. The reset execution portion controls the reset portion to reset the operation of the software executed by the reset object portion at a reset time point that is preliminary determined in the off state of the vehicle power source. The reset portion resets the operation of the software when the power source determination portion determines that the vehicle power source is in the off state.

The time point at which the predetermined duration related to the service executed by the software in off state of the vehicle power source does not conflict with the reset duration is determined as the reset time point. With this configuration, the software operation can be reset without interrupting the service. Thus, the software operation can be properly reset and stabilized.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Hereinafter, an embodiment will be described with reference to the drawings.

Figure 1:
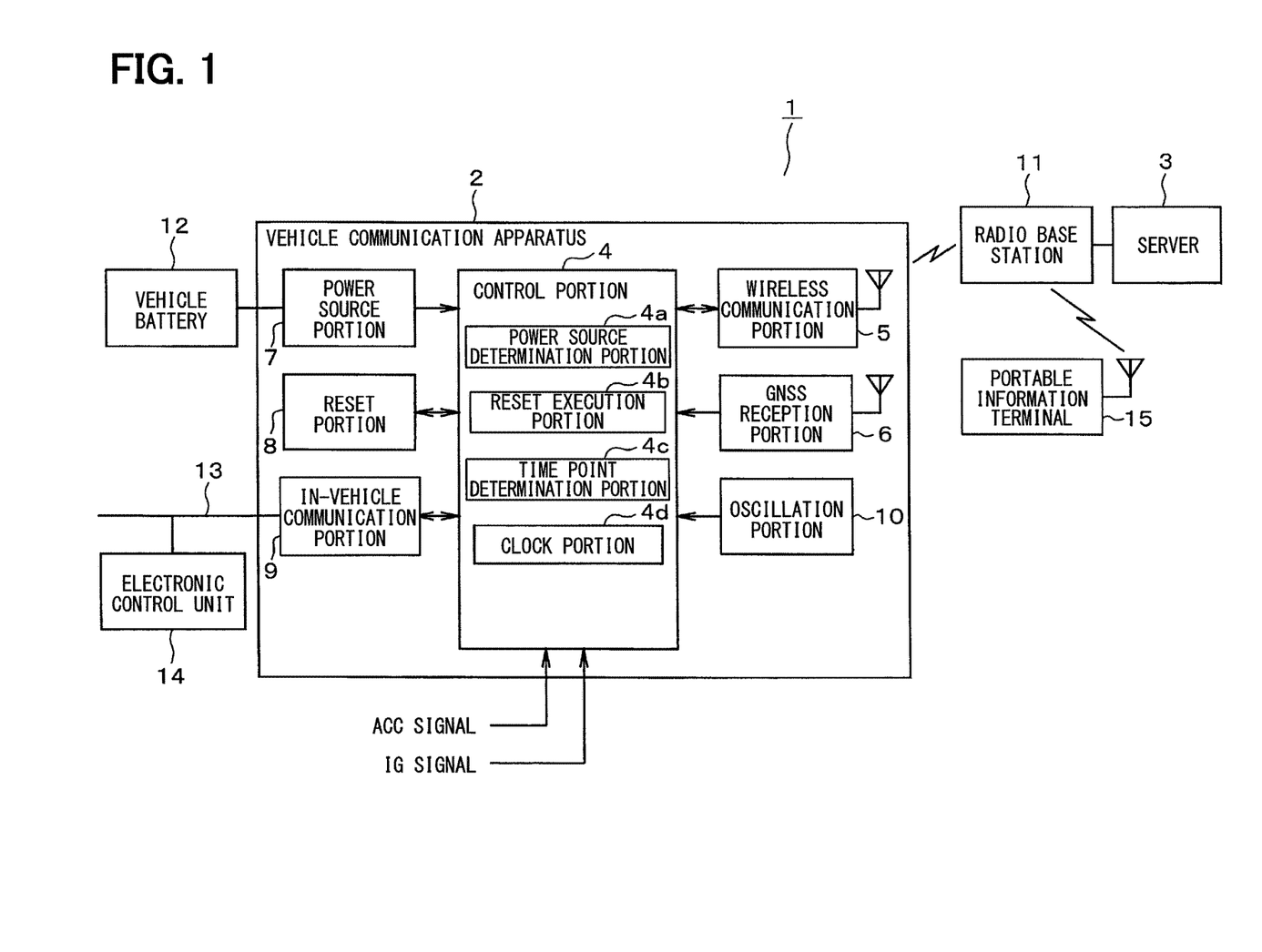
FIG. 1 is a functional block diagram showing an embodiment.

In a communication system 1, a vehicle communication apparatus 2 that is attached to a vehicle and a server 3 (corresponds to an external apparatus) execute a wireless communication with one another. The vehicle communication apparatus 2 includes a control portion 4 (corresponds to a reset object portion), a wireless communication portion 5 (corresponds to the reset object portion), a GNSS (Global Navigation Satellite System) receive portion 6, a power source portion 7, a reset portion 8, an in-vehicle communication portion 9, and an oscillation portion 10.

The control portion 4 is provided by a microcomputer that has a CPU (Central Processing Unit), a ROM (Read Only Memory), a RAM (Random Access Memory), and an I/O (Input/Output). The control portion 4 executes software related to a control of the entire apparatus and controls the vehicle communication apparatus 2 by executing a computer program stored in a non-transitory tangible storage media. The wireless communication portion 5 executes software related to the wireless communication and controls the wireless communication of the vehicle communication apparatus 2 by executing a computer program stored in the non-transitory tangible storage media. The wireless communication portion 5 and a radio base station 11 execute transmission and reception of a communication wave with one another so that the wireless communication portion 5 executes a wide area wireless communication with the server 3. The control portion 4 and the wireless communication portion 5 are configured in one chip.

The GNSS reception portion 6 extracts various types of parameters from a GNSS signal received from a satellite, calculates a present position using the extracted various types of parameters, and outputs the calculated present position to the control portion 4. The power source portion 7 acquires electric power as operation power from a vehicle battery 12 that is attached to the vehicle.

The reset portion 8 outputs a reset command to the control portion 4 when the control portion 4 inputs a reset request to the reset portion 8. The control portion 4 outputs the reset command to the wireless communication portion 5 and resets (that is, initializes) software operation when the reset portion 8 outputs the reset command to the control portion 4. The wireless communication portion 5 resets the software operation when the control portion 4 outputs the reset command to the wireless communication portion 5. In the control portion 4 and the wireless communication portion 5, reset of the software operation represents operation of predetermined processing from the beginning (that is, restart or refresh) regardless of a software state that is executed normally or not at a present time point.

The in-vehicle communication portion 9 is connected to an in-vehicle LAN 13 that is attached to the vehicle. The in-vehicle communication portion 9 communicates with an electronic control unit (ECU (Electronic Control Unit)) 14 (corresponds to the external apparatus) through the in-vehicle LAN 13. The oscillation portion 10 generates a reference clock, and outputs the generated reference clock to the control portion 4.

The control portion 4 includes a power source determination portion 4a, a reset execution portion 4b, a time point determination portion 4c, and a clock portion 4d. Each of the portions 4a to 4d is achieved by executing the software. The power source determination portion 4a determines whether a vehicle power source is in on state or in off state using an ACC signal and an IG signal. The ACC signal represents on state or off state of an ACC (accessory). The IG signal represents on state or off state of an IG (ignition). That is, the power source determination portion 4a identifies on state of the vehicle power source based on on state of the ACC signal or on state of the IG signal, and identifies off state of the vehicle power source based on off state of the ACC signal and off state of the IG signal.

The reset execution portion 4b controls the reset portion 8 to reset the software operation executed by the control portion 4, the software operation executed by the wireless communication portion 5, or both at a reset time point that is determined by the time point determination portion 4c. The time point determination portion 4c determines the reset time point that is a time point at which predetermined duration does not conflict with reset duration. The predetermined duration represents duration in which the software executes a service in off state of the vehicle power source, and the reset duration represents duration in which the software operation is reset. The clock portion 4d counts time using the reference clock input from the oscillation portion 10.

In the above-described configuration, the power source portion 7 acquires the electric power supplied from the vehicle battery 12 as the operation power so that each of the control portion 4 and the wireless communication portion 5 executes the software regardless of on state or off state of the vehicle power source. The control portion 4 and the wireless communication portion 5 execute service, such as an emergency call, a destination setting by data communication, or a voice communication when the vehicle power source is in on state, that is, in general, a user stays in the vehicle. The control portion 4 and the wireless communication portion 5 execute service, such as a vehicle tracking for theft, a remote engine start, or a remote door lock and unlock when the vehicle power source is in off state, that is, in general, the user stays outside of the vehicle. The service executed by the control portion 4 and the wireless communication portion 5 in off state of the vehicle power source includes service that is triggered when the vehicle power source switches from on state to off state (that is, service executed immediately after parking), or service that is triggered when a specific time point that is previously set arrives (that is, periodic service executed during the parking).

The control portion 4 executes the service at the time immediately after the parking, such as service that controls the wireless communication portion 5 to transmit a door lock forgotten notification signal to the server 3. The door lock forgotten notification signal represents a state that a door lock is forgotten. In this case, the server 3 transmits the door lock forgotten notification signal to a portable information terminal 15, which is carried by the user and previously set as a destination, when receiving the door lock forgotten notification signal from the vehicle communication apparatus 2. The portable information terminal 15 notifies the user that the door lock is forgotten when receiving the door lock forgotten notification signal from the server 3. The portable information terminal 15 transmits a door lock instruction signal (operation instruction signal, or remote operation instruction signal) to the server 3 when receiving a signal of the operation for the door lock from the user. The server 3 transmits the door lock instruction signal to the vehicle communication apparatus 2 when receiving the door lock instruction signal from the portable information terminal 15. The control portion 4 executes a door lock control by outputting the door lock instruction signal from the in-vehicle communication portion 9 to a door lock ECU, which is not shown in figures, when receiving the door lock instruction signal from the server 3 through the wireless communication portion 5.

The control portion 4 executes the periodic service during the parking, such as service that controls the wireless communication portion 5 to transmit a present position notification signal to the server 3. The present position notification signal represents the present position (that is, a parking position) calculated by the GNSS reception portion 6. In this case, the server 3 transmits the present position notification signal to the portable information terminal 15 that is previously set as a destination after receiving the present position notification signal from the vehicle communication apparatus 2. The server 3 determines whether there is a possibility of vehicle theft using a history of the present position. The server 3 transmits a theft notification signal to the portable information terminal 15 that is previously set as the destination after determining that there is the possibility of vehicle theft. The portable information terminal 15 notifies the user of the present position of the vehicle after receiving the present position notification signal from the server 3. The portable information terminal 15 notifies the user that there is the possibility of the vehicle theft after receiving the theft notification signal from the server 3.

Operation of the above-described configuration will be described with reference to FIG. 2 to FIG. 11. The control portion 4 executes reset processing shown in FIG. 2.

Figure 2:
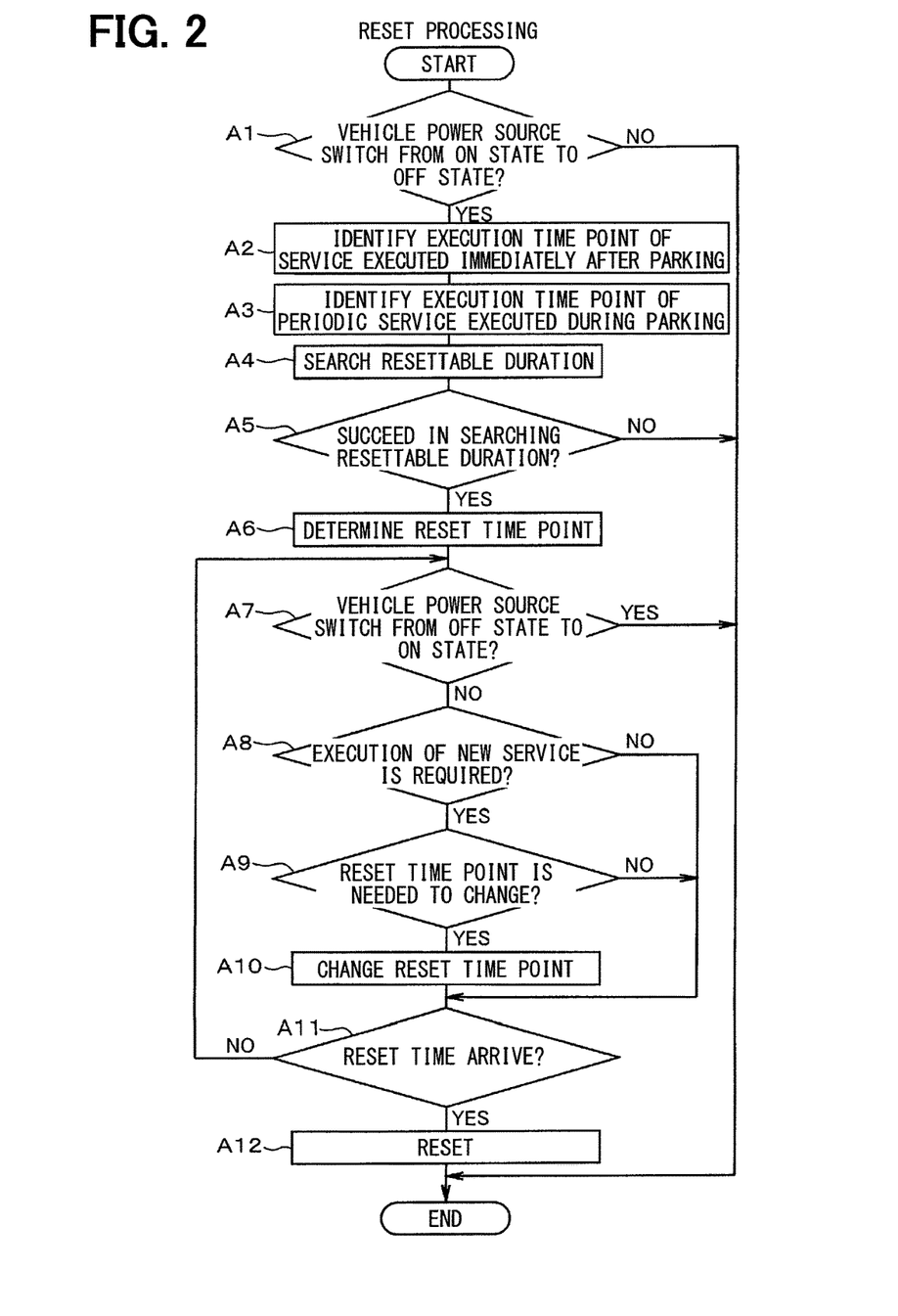
FIG. 2 is a flowchart showing reset processing.

The control portion 4 determines whether the vehicle power source switches from on state to off state when starting the reset processing (A1, a first step). When determining that the vehicle power source does not switch from on state to off state (A1: NO), the control portion 4 ends the reset processing and waits for a start of next reset processing. When the ACC signal switches from on state to off state and the IG signal switches from on state to off state so that the control portion 4 determines that the vehicle power source switches from on state to off state (A1: YES), the control portion 4 identifies an execution time point of the service executed immediately after parking (A2). Assume that the control portion 4 executes the service that controls the wireless communication portion 5 to transmit the door lock forgotten notification signal as the service executed immediately after the parking. In this case, the control portion 4 identifies a time point for controlling the wireless communication portion 5 to transmit the door lock forgotten notification signal as the execution time point.

The control portion 4 identifies the execution time point of the periodic service executed during the parking (A3). Assume that the control portion 4 executes, as the periodic service executed during the parking, the service that controls the wireless communication portion 5 to transmit the present position notification signal. In this case, the control portion 4 identifies a time point for controlling the wireless communication portion 5 to transmit the present position notification signal as the execution time point.

In consideration of the execution time point of the identified service, the control portion 4 searches resettable duration that corresponds to a sum of set duration (for example, one hour) that is previously set and the reset duration (A4). The set duration is a duration that is previously set in consideration of execution of another service related to the executed service or retry of the execution of the service. The reset duration is duration from an initial point to a terminal point of the reset of the software operation (that is, from start to end of the reset). When the control portion 4 succeeds in searching the resettable duration (A5: YES), in the resettable duration, a time point after an elapse of the set duration from a start point of the resettable duration is set as the reset time point. Herein, the start time point of the resettable duration is an end point of a preceding service.

Figure 3:
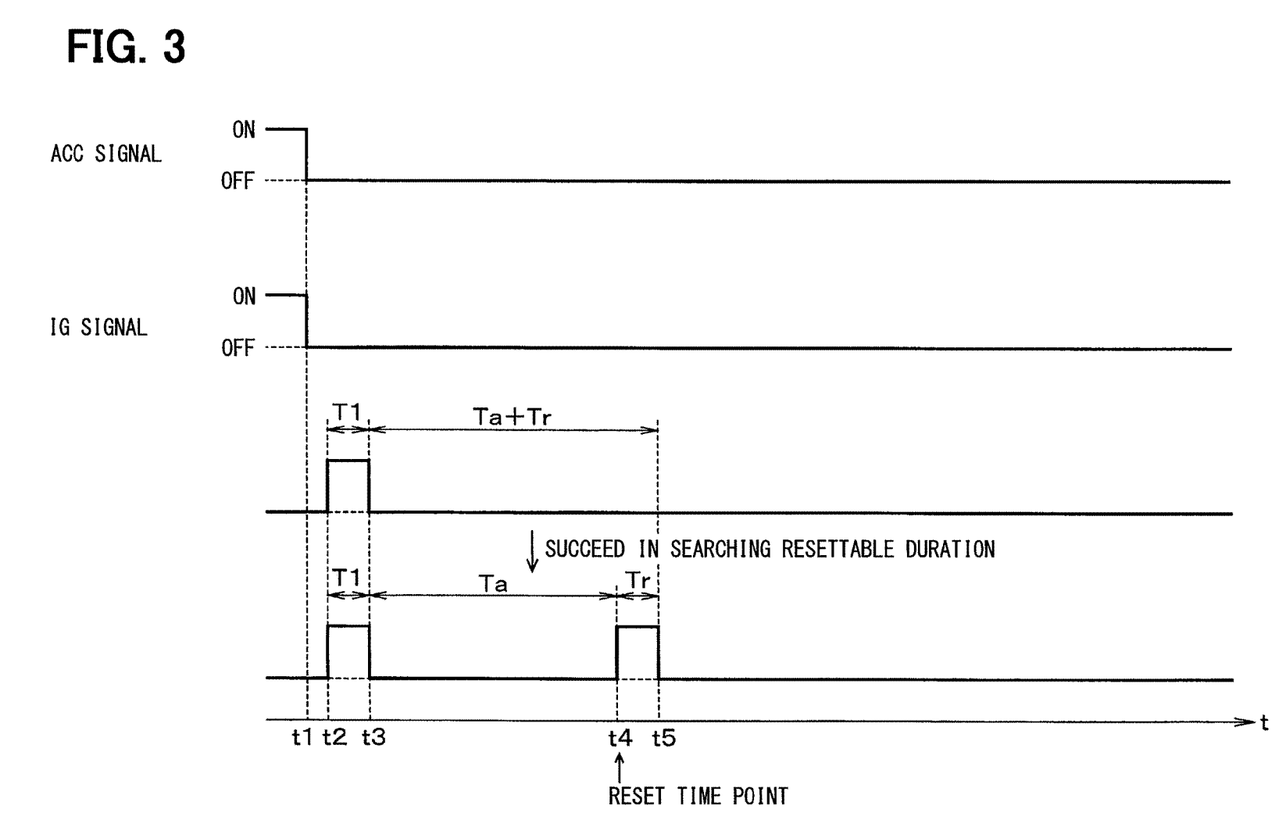
FIG. 3 is a graph showing a first timing diagram.

As shown in FIG. 3, it is assumed that after determining that the vehicle power source switches from on state to off state at a time point t1, the control portion 4 identifies an execution time point t2 of the service executed immediately after the parking or the periodic service executed during the parking. Assume that service execution duration T1 is defined from the initial point to the terminal point of the execution of the service (that is, from a start to an end of the service). The control portion 4 searches resettable duration Ta+Tr, which corresponds to a sum of set duration Ta and reset duration Tr, from a terminal point t3 of the service execution duration T1. In this case, the control portion 4 does not identify another service execution duration after the terminal point t3, and determines the resettable duration is capable of being ensured immediately after the terminal point t3. Thus, the control portion 4 succeeds in searching the resettable duration. When the control portion 4 succeeds in searching the resettable duration, a time point after an elapse of the set duration Ta from the start point of the resettable duration is set as a reset time point t4. Herein, the start time point of the resettable duration Ta is a terminal point t3. That is, duration that includes the service execution duration T1 and the set duration Ta may be defined as predetermined duration T1+Ta related to the service. In this case, the control portion 4 determines the reset time point so that the predetermined duration T1+Ta does not conflict with the reset duration Tr.

Figure 4:
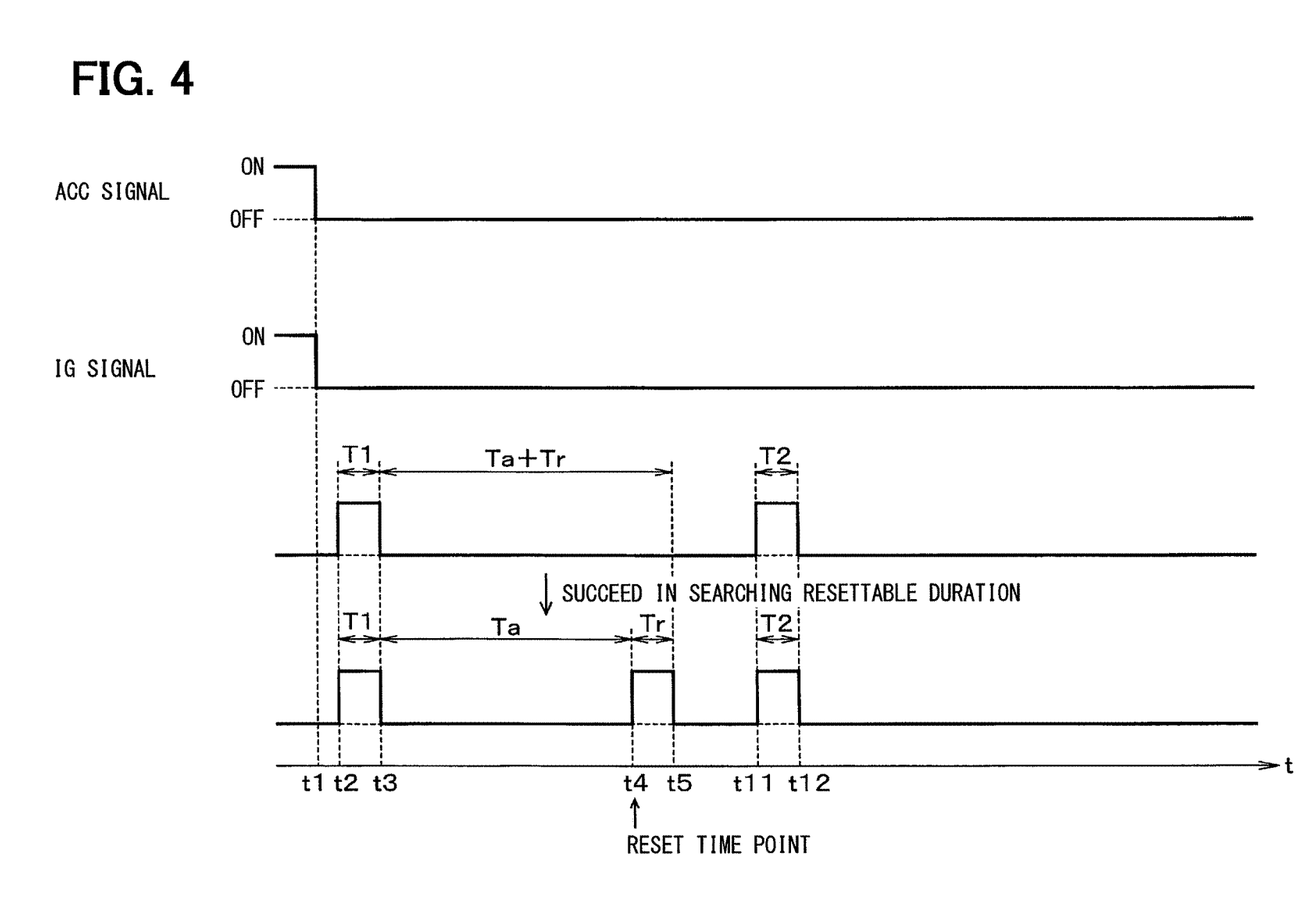
FIG. 4 is a graph showing a second timing diagram.
Figure 5:
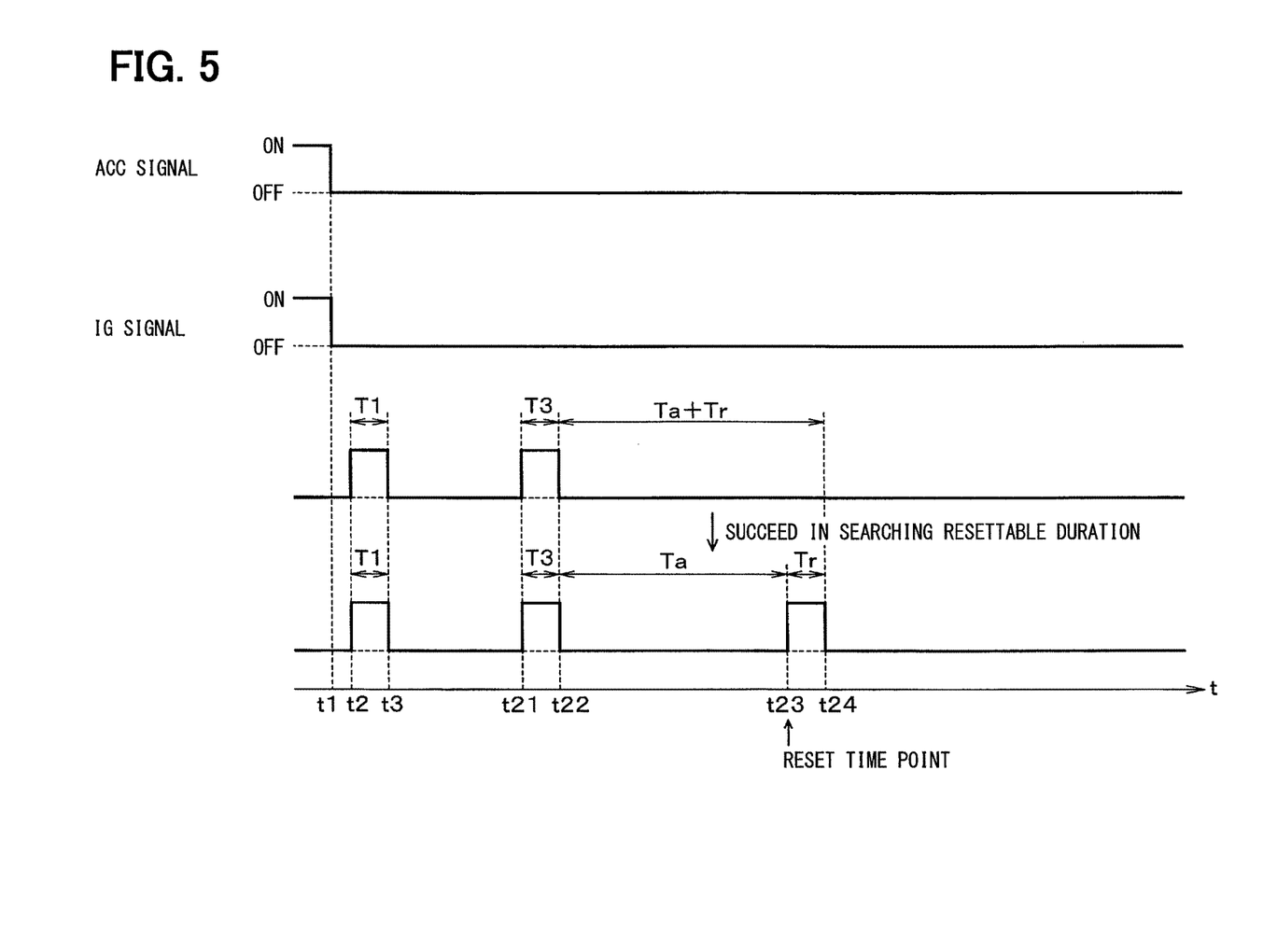
FIG. 5 is a graph showing a third timing diagram.

As shown in FIG. 4 and FIG. 5, it is assumed that after determining that the vehicle power source switches from on state to off state at a time point t1, the control portion 4 identifies an execution time point t2 of the service executed immediately after the parking or the periodic service executed during the parking, and further identifies an execution time point of next service. The control portion 4 searches the resettable duration after the terminal point t3 of the service execution duration T1. In this case, the control portion 4 identifies another service execution duration after the terminal point t3, thus compares duration from the terminal point t3 to an initial point of another service execution duration with the resettable duration.

As shown in FIG. 4, when duration from the terminal point t3 of the first service execution duration T1 to an initial point t11 of the next service execution duration T2 is relatively long, the control portion 4 determines that the duration from the terminal point t3 to the initial point t11 is longer than the resettable duration. That is, the control portion 4 determines that the resettable duration is capable of being ensured immediately after the terminal point t3, which is similar to the case shown in FIG. 3, and succeeds in searching the resettable duration. After succeeding in searching the resettable duration, the control portion 4 determines a time point t4, which is after the terminal point t3 by the set duration Ta, as the reset time point.

As shown in FIG. 5, when the duration from the terminal point t3 of the first service execution duration T1 to an initial point t21 of the next service execution duration T3 is relatively short, the control portion 4 determines that the duration from the terminal point t3 to the initial point t21 is shorter than the resettable duration. That is, the control portion 4 determines that the resettable duration is not capable of being ensured immediately after the terminal point t3, which is different from the cases shown in FIG. 3 and FIG. 4, and fails to search the resettable duration. After failing to search the resettable duration, the control portion 4 searches the resettable duration immediately after the terminal point t22 of the next service execution duration T3. In this case, the control portion 4 does not identify another service execution duration after the terminal point t22, and determines that the resettable duration is capable of being ensured immediately after the terminal point t22. Thus, the control portion 4 succeeds in searching the resettable duration. After succeeding in searching the resettable duration, the control portion 4 determines the time point t23, which is after terminal point t22 by the set duration Ta, as the reset time point. That is, duration that includes the service execution duration T3 and the set duration Ta may be defined as predetermined duration T3+Ta related to the service. In this case, the control portion 4 determines the reset time point so that the predetermined duration T3+Ta does not conflict with the reset duration Tr. The processing for the case that the service execution duration occurs twice has been described. The processing for a case that the service execution duration occurs for equal to or more than three times is similar to the above-described processing.

After determining the reset time point, the control portion 4 determines whether the vehicle power source switches from off state to on state (A7), determines whether service to be newly executed by the software is required (A8, a fourth step), and determines whether the reset time point arrives (A11). Before determining whether the reset time point arrives, when the control portion 4 determines that the vehicle power source switches from off state to on state (A7: YES), the control portion 4 ends the reset processing. Herein, when the ACC signal switches from off state to on state or the IG signal switches from off state to on state, the vehicle power source is determined to be switched from off state to on state. After ending the present reset processing, the control portion 4 waits for a start of next reset processing. When ending the reset processing, the control portion 4 discards (that is, deletes) the reset time point that is determined at a present time point.

When determining that the service to be newly executed by the software is required (A8: YES), the control portion 4 determines whether the reset time point that is determined at a present time point needs to be changed (A9, a fifth step). The service to be newly executed by the software differs from the service executed immediately after the parking or the periodic service executed during the parking described above. When determining that the reset time point does not need to be changed (A9: NO), the control portion 4 maintains the reset time point without changing. On the other hand, when determining that the reset time point needs to be changed (A9: YES), the control portion 4 changes the reset time point (A10, a sixth step).

Figure 6:
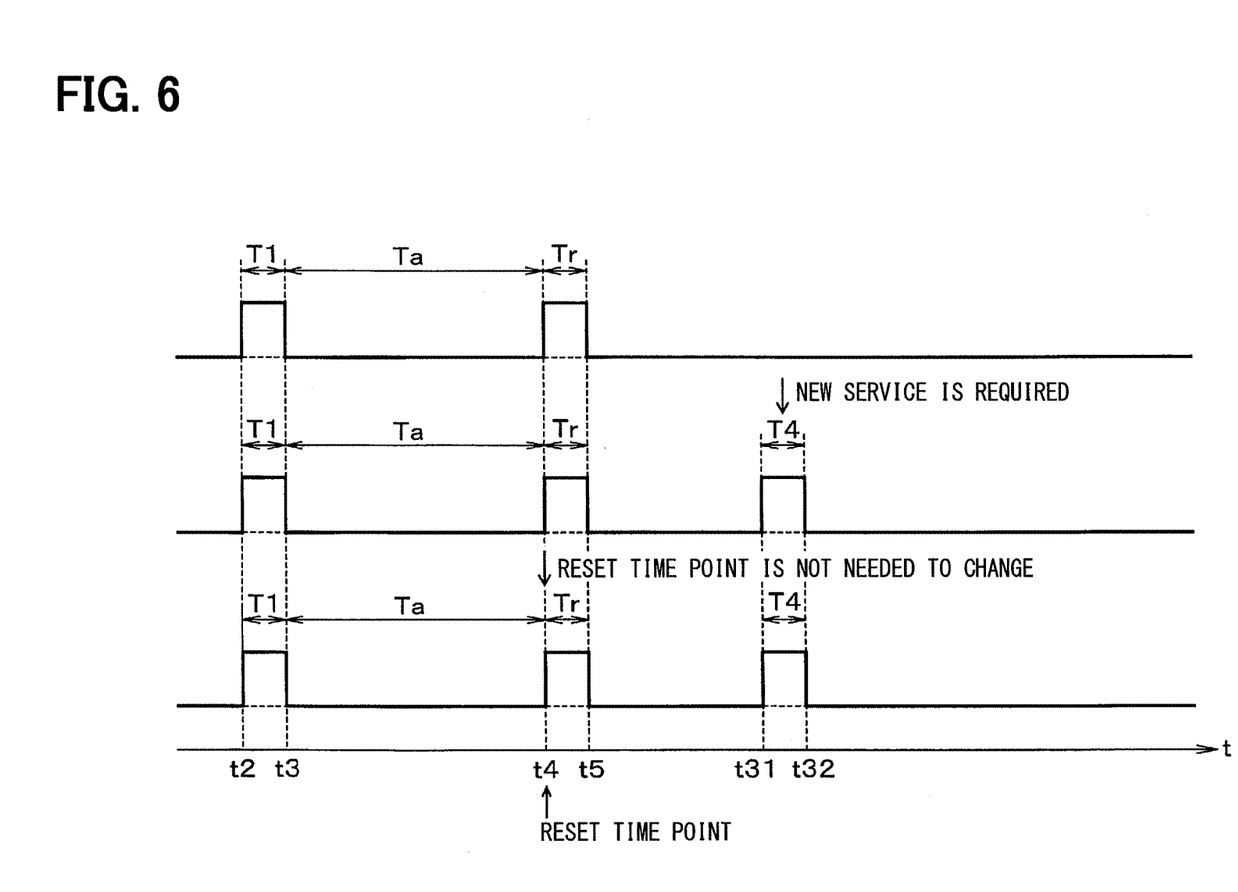
FIG. 6 is a graph showing a fourth timing diagram.

Assume that the service to be newly executed by the software is required after the control portion 4 determines the time point t4 as the reset time point as shown in FIG. 3. In this case, the control portion 4 determines whether the predetermined duration related to the service to be newly executed by the software conflicts with the reset duration that has been determined, and determines whether the reset time point needs to be changed. As shown in FIG. 6, assume that the service to be newly executed by the software is required after the terminal point t5 of the reset duration, the control portion 4 identifies service execution duration T4 after the terminal point t5. In this case, the control portion 4 determines that the predetermined duration related to the service to be newly executed by the software does not conflict with the reset duration that has been determined, and determines the reset time point does not need to be changed. That is, the control portion 4 maintains the reset time point without changing.

Figure 7:
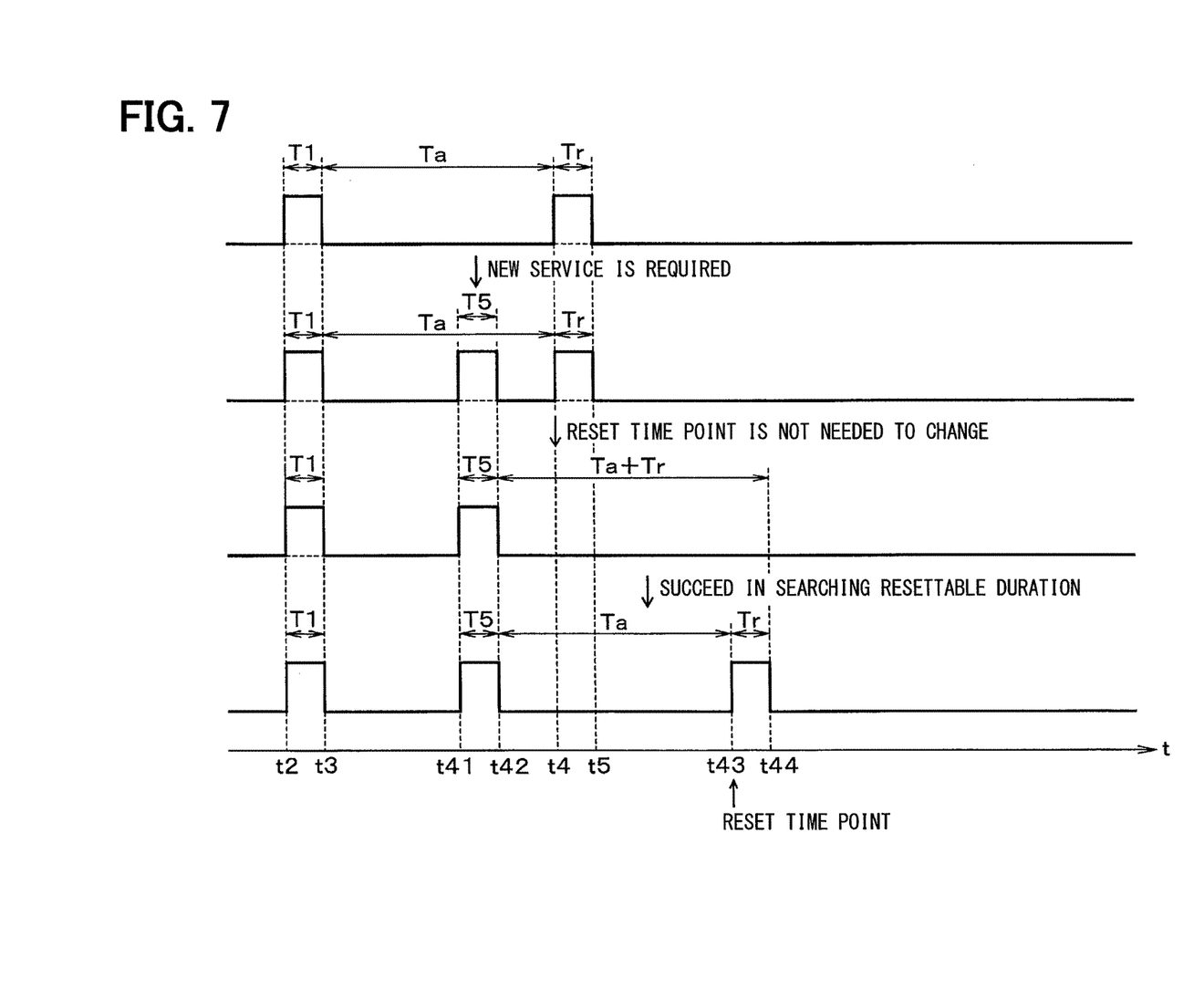
FIG. 7 is a graph showing a fifth timing diagram.

As shown in FIG. 7, assume that the service to be newly executed by the software is required between the terminal point t3 of the service execution duration T1 and the initial point t4 of the reset duration. In this case, the control portion 4 identifies service execution duration T5 between the time points t3 and t4. The control portion 4 determines that the predetermined duration related to the service to be newly executed by the software conflicts with the reset duration that has been determined, and determines that the reset time point needs to be changed. The control portion 4 searches the resettable duration immediately after a terminal point t42 of the service execution duration T5 for the service to be newly executed. When the resettable duration is capable of being ensured immediately after the time point t42, the control portion 4 succeeds in searching the resettable duration. When succeeding in searching the resettable duration, the control portion 4 determines a reset time point t43 after an elapse of the set duration Ta from the time point t42 as a starting point. That is, the control portion 4 changes the reset time point. The processing in the case that the service to be newly executed by the software is required once has been described. The processing in a case that the service to be newly executed by the software is required for multiple times is similar to the above-described processing.

In the above-described configuration, when determining whether to change the reset time point, the control portion 4 determines whether the predetermined duration related to the service to be newly executed by the software conflicts with the reset duration that has been determined. Alternatively, based on the contents of the service, the control portion 4 may determine whether the reset time point needs to be changed. That is, when the service to be newly executed by the software, such as an unlock control or a door open control is executed, there is a high possibility that the user gets on the vehicle after the unlock control or the door open control is required. Assume that the service after which there is a high possibility that the user gets on the vehicle is required. In this case, the control portion 4 may discard the reset time point that is determined at a present time and change the reset time point.

When the control portion 4 determines that the reset time point arrives (A11: YES), the control portion 4 outputs the reset request to the rest portion 8, resets the software operation (A12, a third step), and then the reset processing ends. Specifically, the control portion 4 receives the reset command output from the reset portion 8, outputs the reset command to the wireless communication portion 5, and resets the operation of the own software. The wireless communication portion 5 receives the reset command output from the control portion 4, and then resets the operation of the own software.

With the above-described processing, the control portion 4 determines the reset time point that is the time point at which the predetermined duration related to the service of the software in off state of the vehicle power source does not conflict with the reset duration. When the reset time point arrives, the control portion 4 resets both the operation of the own software and the software operation of the wireless communication portion 5. In the above-described configuration, both the software operation of the control portion 4 and the software operation of the wireless communication portion 5 are reset. Alternatively, either the software operation of the control portion 4 or the software operation of the wireless communication portion 5 may be reset. That is, when receiving the reset command output from the reset portion 8, the control portion 4 may output the reset command to the wireless communication portion 5 without resetting the operation of the own software. Alternatively, when receiving the reset command output from the reset portion 8, the control portion 4 may reset the operation of the own software without outputting the reset command to the wireless communication portion 5.

Operation of the server 3 which transmits the remote control instruction signal, such as the door lock instruction signal will be described with reference to FIG. 8 and FIG. 9. As described above, when the portable information terminal 15 receives the instruction of the remote operation, such as the operation of the door lock transmitted from the user, and the server 3 determines that the remote control instruction signal is received from the portable information terminal 15, the server 3 transmits the remote control instruction signal to the vehicle communication apparatus 2. After transmitting the remote control instruction signal to the vehicle communication apparatus 2, the server 3 starts a reception monitor timer (B1) and a retry monitor timer (B2), and waits for receiving the remote control instruction signal until a first predetermined duration elapses from a starting point at which the door lock instruction signal is transmitted.

Figure 8:
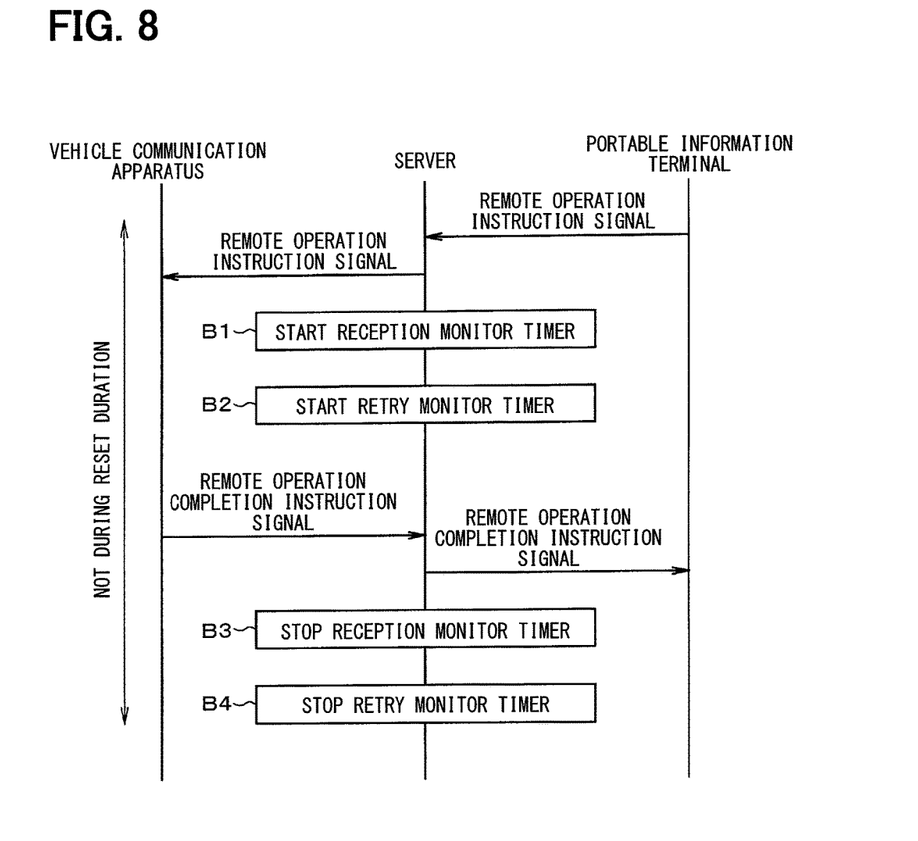
FIG. 8 is a graph showing a first sequence diagram.

As shown in FIG. 8, in the vehicle communication apparatus 2, assume that the control portion 4 is not in the reset duration and the wireless communication portion 5 is not in the reset duration (that is, in non-reset duration). In the non-reset duration, the remote control instruction signal is received by the wireless communication portion 5 and the control portion 4 succeeds in receiving the remote control instruction signal. When determining success in receiving the remote control instruction signal, the control portion 4 outputs the remote control instruction signal to an electronic control unit (that is, a door lock ECU in case of the operation of the door lock), which is not shown in figures and is an object for remote operation, through the in-vehicle communication portion 9, and executes the remote control. After completing executing the remote control, the control portion 4 controls the wireless communication portion 5 to transmit a remote operation completion signal, which represents completion of the control of the remote operation, to the server 3. After the reception monitor timer has been started, the server 3 may determine that the server 3 receives the remote operation completion signal before elapse of the first predetermined duration. In this case, the server 3 transmits the remote operation completion signal to the portable information terminal 15, and stops the reception monitor timer (B3) and the retry monitor timer (B4).

Figure 9:
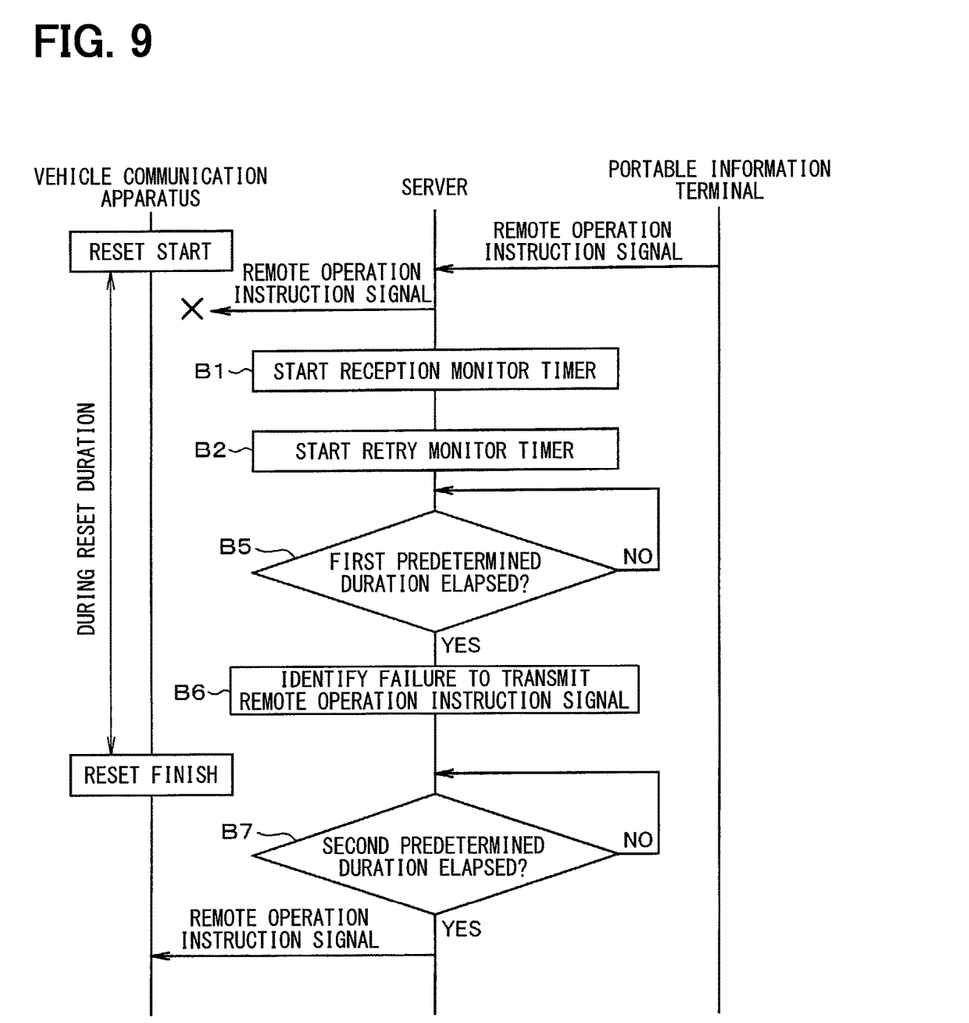
FIG. 9 is a graph showing a second sequence diagram.

As shown in FIG. 9, assume that the control portion 4 is in the reset duration or the wireless communication portion 5 is in the reset duration (that is, in reset duration). In this case, the wireless communication portion 5 does not receive the remote control instruction signal, and the control portion 4 fails to receive the remote control instruction signal. That is, the control portion 4 does not execute the remote operation control, and does not control the wireless communication portion 5 to transmit the remote operation completion signal to the server 3. The server 3 may determine that the first predetermined duration has elapsed without receiving the remote operation completion signal (B5: YES). In this case, the server 3 identifies the failure to transmit the remote operation signal (that is, remote operation is undelivered to the vehicle communication apparatus 2) (B6), and determines whether a second predetermined duration has elapsed since the server 3 starts the retry monitor timer (B7). When determining that the second predetermined duration has elapsed, the server 3 retries to transmit the remote control instruction signal. In this case, the server 3 sets the second predetermined duration to be longer than the reset duration so that a duration of retry cycle for transmitting the remote operation instruction signal is set to be longer than the reset duration. That is, the server 3 sets the duration of cycle in which the server 3 retries to transmit the remote operation instruction signal to be longer than the reset duration so as to avoid transmission retry of the remote operation instruction signal in the reset duration of the vehicle communication apparatus 2.

Figure 10:
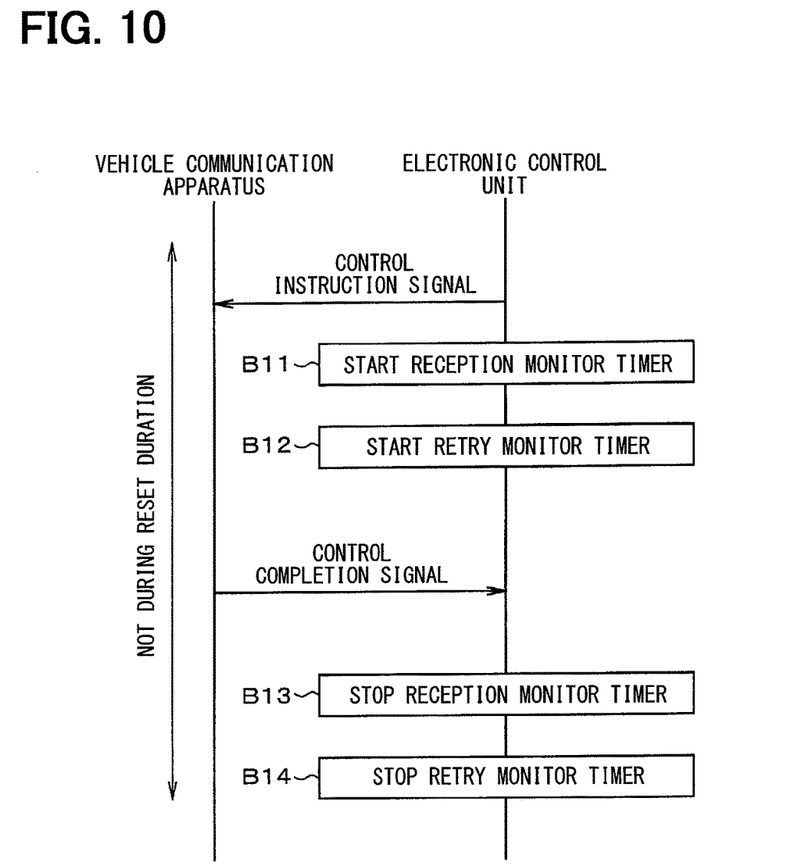
FIG. 10 is a graph showing a third sequence diagram.
Figure 11:
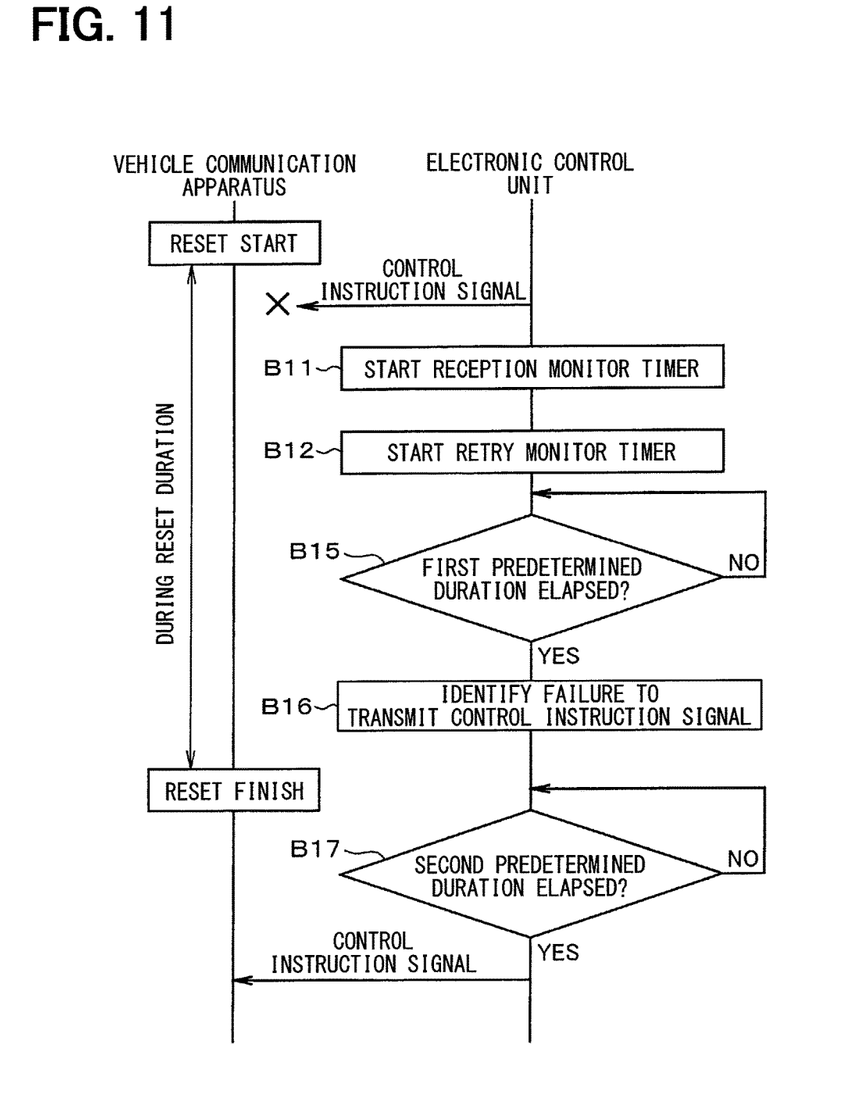
FIG. 11 is a graph showing a fourth sequence diagram.

In the above-described configuration, the server 3 transmits the remote operation instruction signal to the vehicle communication apparatus 2. As shown in FIG. 10 and FIG. 11, the configuration that the electronic control unit 14 transmits the control instruction signal to the vehicle communication apparatus 2 is similar to the configuration described above (B11 to B17). That is, the electronic control unit 14 sets the second predetermined duration to be longer than the reset duration so that a duration of retry cycle for transmitting the control instruction signal is set to be longer than the reset duration. The electronic control unit 14 sets the duration of cycle in which the electronic control unit 14 retries transmission of the control instruction signal to be longer than the reset duration so as to avoid transmission retry of the control instruction signal in the reset duration of the vehicle communication apparatus 2.

The present embodiment described above can provide advantages described below.

In the vehicle communication apparatus 2, in off state of the vehicle power source, the time point at which the predetermined duration related to the service does not conflict with the reset duration is determined as the reset time point. The software operation of the control portion 4 and the software operation of the wireless communication portion 5 are reset at the reset time point. With this configuration, the software operation can be reset without interrupting the service that is executed by the software in off state of the vehicle power source, and the software operation can be properly reset and stabilized.

In the vehicle communication apparatus 2, service to be newly executed by the software may be required after the reset time point is determined. When the predetermined duration related to the service to be newly executed conflicts with the reset duration that is previously determined, the reset time point is determined again. With this configuration, even when the service to be newly executed by the software is required, the reset time point is determined again so that the software operation can be properly reset and stabilized.

When the server 3 retries to transmit the remote operation instruction signal to the vehicle communication apparatus 2, the duration of retry cycle for transmitting the remote operation instruction signal is set to be longer than the reset duration of the vehicle communication apparatus 2. With this configuration, the server 3 can avoid transmission retry of the remote operation instruction signal in the reset duration of the vehicle communication apparatus 2. When the electronic control unit 14 retries to transmit the control instruction signal to the vehicle communication apparatus 2, the duration of retry cycle for transmitting the control instruction signal is set to be longer than the reset duration of the vehicle communication apparatus 2. With this configuration, the electronic control unit 14 can avoid transmission retry of the control instruction signal in the reset duration of the vehicle communication apparatus 2.

An example of the embodiment has been described, and the embodiment can be modified or broadened into various types.

In the above-described embodiment, the software operation of the control portion 4 or the wireless communication portion 5 has been described. Alternatively, the software operation of another functional block other than the control portion 4 or the wireless communication portion 5 may be reset.

Different duration may be set to the corresponding service as the set duration. That is, when a service is executed and there is a high probability that another service that is related to the executed service will be executed or the executed service will be retried, the set duration may be set long. When the service is executed and there is a low probability that another service that is related to the executed service will be executed or the executed service will be retried, the set duration may be set short.

What is claimed is:

1. A vehicle communication apparatus comprising:
    a reset object portion that executes a software in both an on state and an off state of a vehicle power source;
    a reset portion that resets an operation of the software executed by the reset object portion;
    a power source determination portion that determines whether the vehicle power source is in the on state or the off state; and
    a reset execution portion that controls the reset portion to reset the operation of the software executed by the reset object portion at a reset time point that is preliminary determined in the off state of the vehicle power source, wherein the reset portion resets the operation of the software when the power source determination portion determines that the vehicle power source is in the off state.

2. The vehicle communication apparatus according to claim 1, further comprising
    a time point determination portion that determines, as the reset time point, a time point at which a predetermined duration does not conflict with a reset duration, wherein the predetermined duration is a duration related to a service provided by the software executed in the off state of the vehicle power source, and
    wherein the reset execution portion controls the reset portion to reset the operation of the software executed by the reset object portion at the reset time point that is determined by the time point determination portion.

3. The vehicle communication apparatus according to claim 2, wherein
    the time point determination portion determines, as the reset time point, the time point at which the predetermined duration does not conflict with the reset duration, and
    the predetermined duration is a duration related to a service that is triggered when the vehicle power source switches from the on state to the off state.

4. The vehicle communication apparatus according to claim 2, wherein
    the time point determination portion determines, as the reset time point, the time point at which the predetermined duration does not conflict with the reset duration, and
    the predetermined duration is a duration related to a service that is triggered when a specific time point that is previously set arrives.

5. The vehicle communication apparatus according to claim 2, wherein after the reset time point is set, when the time point determination portion determines that the reset time point that has been set needs to be changed in response to a request for a service to be newly executed by the software, the time point determination portion changes the reset time point that has been set.

6. The vehicle communication apparatus according to claim 1, wherein
    the reset object portion includes at least one of a control portion or a wireless communication portion,
    the control portion executes a software related to a control of the vehicle communication apparatus, and
    the wireless communication portion executes a software related to a wireless communication.

7. A program product stored in a non-transitory tangible computer readable storage medium, the program product comprising instructions executed by a microcomputer of a vehicle communication apparatus, wherein the vehicle communication apparatus comprises a reset object portion and a reset portion, the reset object portion executes a software in both an on state and an off state of a vehicle power source, and the reset portion resets an operation of the software executed by the reset object portion,
    the instructions comprising:
    determining a duration in which the vehicle power source is in the off state;
    determining a reset time point; and
    controlling the reset portion to reset the operation of the software executed by the reset object portion at the reset time point that is determined in the off state of the vehicle power source when the off state of the vehicle power source is determined.

8. The program product according to claim 7, wherein
    in the determining the reset time point, a time point at which a predetermined duration does not conflict with a rest duration is set as the reset time point, and
    the predetermined duration is a duration related to a service that is provided by the software executed in the off state of the vehicle power source.

9. The program product according to claim 8, further comprising instructions for:
    determining whether a service to be newly executed by the software is required after the reset time point is determined;
    determining whether the reset time point that has been set needs to be changed in response to a request for the service to be newly executed by the software; and
    changing the reset time point that has been set when the determination that the reset time point needs to be changed is made.

10. A non-transitory tangible computer readable storage medium that stores the program product according to claim 7.

11. A communication system comprising:
    a vehicle communication apparatus that controls a reset portion to reset an operation of a software executed by a reset object portion at a reset time point that is preliminary determined in an off state of a vehicle power source; and
    an external apparatus that transmits an operation instruction signal to the vehicle communication apparatus,
    wherein, when the external apparatus retries to transmit the operation instruction signal to the vehicle communication apparatus in the off state of the vehicle power source, a duration of retry cycle for transmitting the operation instruction signal to the vehicle communication apparatus is set to be longer than a reset duration.

12. The communication system according to claim 11, wherein
   the external apparatus includes a server, and
   the server transmits, as the operation instruction signal, a remote operation instruction signal to the vehicle communication apparatus.

13. The communication system according to claim 11, wherein
   the external apparatus includes an electronic control unit, and
   the electronic control unit transmits, as the operation instruction signal, a control instruction signal to the vehicle communication apparatus.

* * * * *